Feb. 21, 1967 E. C. NAUMANN ETAL 3,304,768
FATIGUE TESTING DEVICE
Filed June 24, 1964 3 Sheets-Sheet 1

INVENTORS
EUGENE C. NAUMANN
EMMETT L. BRYANT

BY
William H. King
ATTORNEYS

INVENTORS
EUGENE C. NAUMANN
EMMETT L. BRYANT

BY
William H. King
ATTORNEYS

INVENTORS
EUGENE C. NAUMANN
EMMETT L. BRYANT

BY
William H. King
ATTORNEYS

United States Patent Office 3,304,768
Patented Feb. 21, 1967

3,304,768
FATIGUE TESTING DEVICE
Eugene C. Naumann and Emmett L. Bryant, Newport News, Va., assignors to the United States of America as represented by the Administrator of the National Aeronautics and Space Administration
Filed June 24, 1964, Ser. No. 377,777
8 Claims. (Cl. 73—90)

The invention described herein may be manufactured and used by or for the Government of the United States of America for governmental purposes without the payment of any royalties thereon or therefor.

This invention relates generally to fatigue testing and more specifically concerns a fatigue testing device which applies random discrete load levels to a test specimen.

The aircraft designer is acutely aware of the structural fatigue problems which exist in modern-day aircraft. In order to design a structure having a reasonable fatigue life he must be able to estimate its life under service loading. Since there are no known theories which can be used to predict accurately the life under service loading, the designer must rely on the fatigue test as a means of obtaining a reliable estimate of life. If the random load time histories encountered in service could be duplicated in a laboratory test, the estimate obtained from such a test would undoubtedly be considered reliable. However, prior art fatigue testing equipment is generally limited to applying simple cyclic loads. The disadvantages of this prior art fatigue testing equipment consists of its restricted ability to obtain precise loads of any desired magnitude and its inflexibility of programming which handicap the making of routine test changes such as specimen dimensions and variations of mean load.

It is, therefore, an object of this invention to provide a fatigue testing device that is flexible in its program of load levels applied to a specimen.

Another object of this invention is to provide a fatigue testing device that will produce loads of any desired magnitude.

Still another object of this invention is to provide a fatigue testing device whose program can be readily changed.

A further object of this invention is to provide a fatigue testing device that can be programmed to perform any fatigue test, consisting of discrete values regardless of how complex, on a specimen.

Other objects and advantages of this invention will further become apparent hereinafter and in the drawings, in which.

Figure 1:
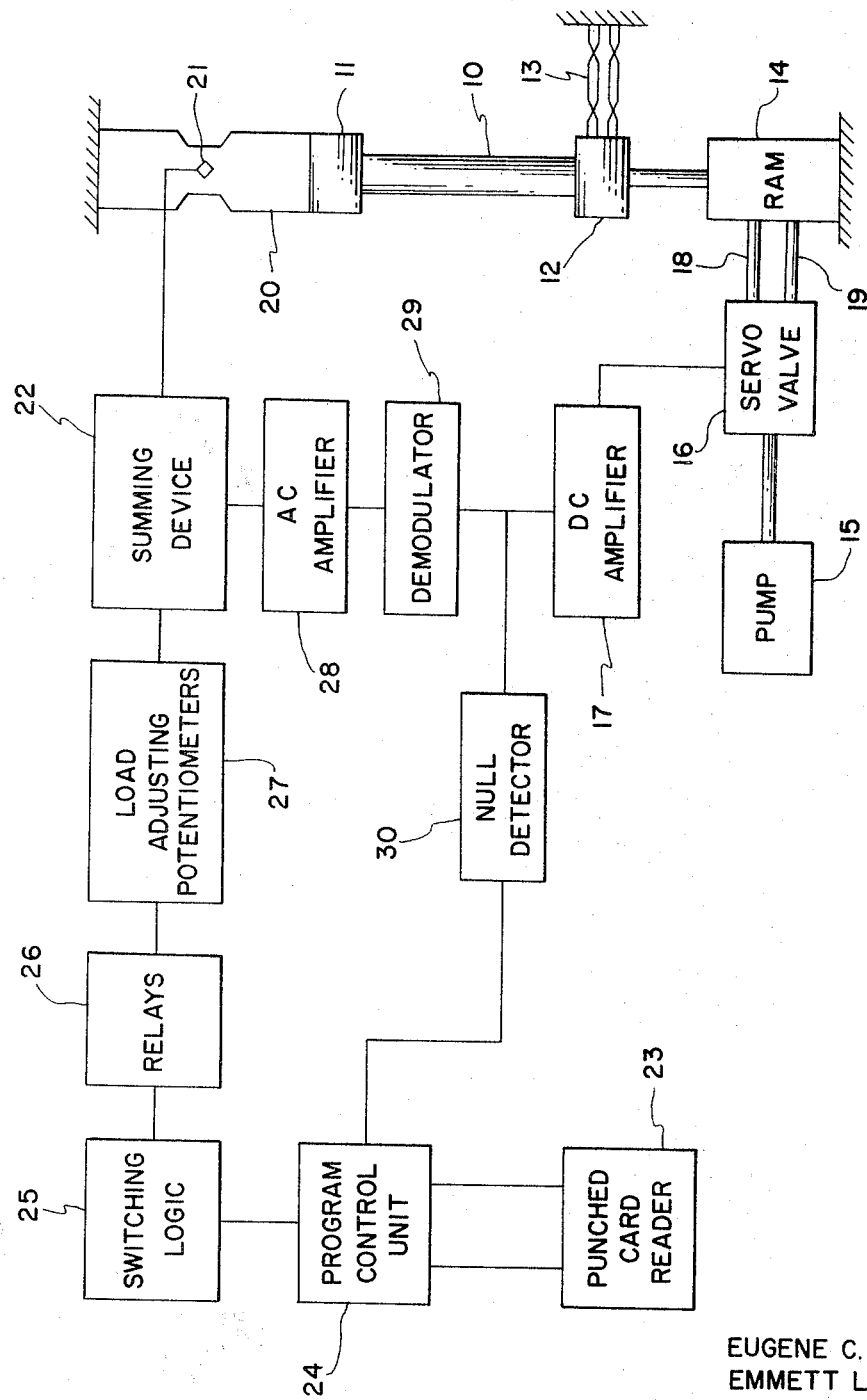
FIG. 1 is a block diagram of the fatigue testing device that constitutes this invention.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the specific embodiment of the invention selected for illustration in the drawings, the number 10 in FIG. 1 designates a specimen that is to be tested. Specimen 10 is held in place by an upper grip 11 and a lower grip 12. Lower grip 12 is held in place by flexure plates 13 so that a hydraulic ram 14 can apply either a compression load or a tension load to specimen 10. Fluid is supplied to ram 14 by pump 15 through a servo valve 16. The amount of fluid flow from pump 15 through servo valve 16 to ram 14 is controlled by the magnitude of the signal applied to servo valve 16 by a D.C. amplifier 17. When the signal applied to servo valve 16 is negative, fluid flows through the valve and a pipe 18 into ram 14. This flow of fluid through pipe 18 causes ram 14 to apply a tension load to specimen 10. When the signal applied to servo valve 16 is positive the fluid flows through the valve and a pipe 19 into ram 14. This flow of fluid through pipe 19 causes ram 14 to apply a compression load to specimen 10. When the signal applied to servo valve 16 is zero, there is no fluid flow through either pipe 18 or pipe 19 and no load is applied to specimen 10. Upper grip 11 is attached to strain gage weight bar 20. A strain gage bridge 21 is attached to a strain gage weight bar 20 such that it produces an electrical voltage output proportional to the load applied to specimen 10 when the specimen is either compression loaded or tension loaded by ram 14. When specimen 10 is compression loaded, strain gage bridge 21 produces a negative voltage proportional to the load and when it is tension loaded, the bridge produces a positive voltage proportional to the load. The voltage produced by strain gage bridge 21 is applied to a summing device 22.

The loads that are to be applied to specimen 10 are programmed on punched cards. These punched cards are put in a punch card reader 23 where they are read and the coded load information contained thereon is transmitted through a program control unit 24 to switching logic 25. The program control unit 24 will be described more in detail in FIG. 2. The switching logic 25 selects one of a group of relays 26 to be actuated. The relay 26 that is actuated connects one of a group of load adjusting potentiometers 27 to summing device 22. The output of summing device 22 is applied to an A.C. amplifier 28 and then to a demodulator 29 where it is changed from A.C. to D.C. The output of demodulator 29 is applied to D.C. amplifier 17. The voltages produces at the outputs of load adjusting potentiometers 27 are A.C. voltages. However, these voltages could be D.C. voltages, then demodulator 29 and A.C. amplifier 28 could be eliminated. The reason that A.C. is used is that D.C. amplifiers have an inherent drift which is undesirable in this system. As can be seen, when a load is selected by punch card reader 23, the output of a certain load adjusting potentiometer 27 is applied through summing device 22, amplifier 28, demodulator 29, and amplifier 11 to servo valve 16 causing a load to be applied to specimen 10. This load causes strain gage bridge 21 to produce a voltage that is negative with respect to the voltage produced by the selected potentiometer 27. The voltage produced by strain gage bridge 21 is applied to summing device 22. When the voltage generated by strain gage bridge 21 is equal to the voltage produced by load adjusting potentiometer 27, a zero error signal appears at the output of demodulator 29. When this error signal becomes zero, a null detector 30 generates a signal that is applied through program control unit 24 to punched card reader 23 causing it to read another card entry. Amplifiers 17 and 28, demodulator 29, null detector 30, punched card reader 23, pump 15, servo valve 16 and ram 14 are all conventional and well known devices and will therefore not be described in detail in this specification.

Figure 2:
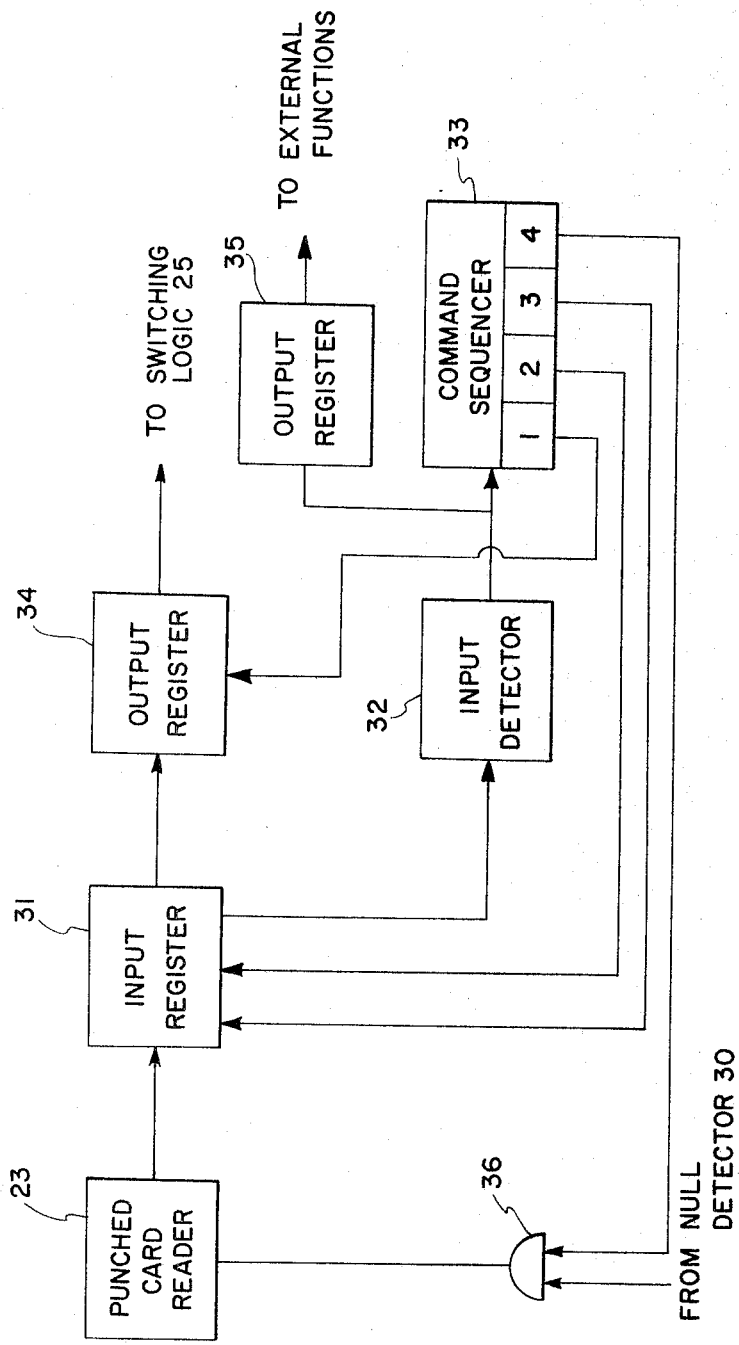
FIG. 2 is a block diagram of the program control unit 24 in FIG. 1.

Referring now to FIG. 2 there is shown a block diagram of program control unit 24 in combination with punched card reader 23. Punched card reader 23 reads a card and applies twelve parallel inputs to an input register 31 consisting of twelve flip flops. The output from these twelve flip flops are applied to an input detector 32 which senses that a card has been read by sending a signal to a command sequencer 33. Command sequencer 33, when receiving a signal from input detector 32, initiates a sequence of four functions: first, a pulse is sent to an output register 34 to clear it; second, a pulse is sent to input register 31 to cause it to transfer the information stored in it into output register 34; third, a pulse is sent to input register 31 to clear it; and fourth, a pulse is sent to "and" gate 36 to open it and allow any signal from null detector 30 to be applied to punched card reader 23 to cause it to read another card. Command sequencer 33 can be made to initiate other functions such as a parity check of the input signals. The twelve outputs from input register 31 are also applied through input detector 32 to an output register 35. The outputs from output register 35 are used to initiate the performance of external functions such as locking out card advance, starting timers which control heating or cooling, and actuating cameras. Output register 34 consists of eleven flip flops which apply eleven parallel inputs to switching logic 25. Input detectors and command sequencers are well known and will therefore not be described in detail. It should be noted at this point that this invention will operate without using the program control unit 24. The output of null detector could be applied directly to punched card reader 23 and the outputs of punched card reader 23 could be applied to switching logic 25. The purpose of program control unit 24 is to coordinate the two mechanical systems used by the invention.

Figure 3:
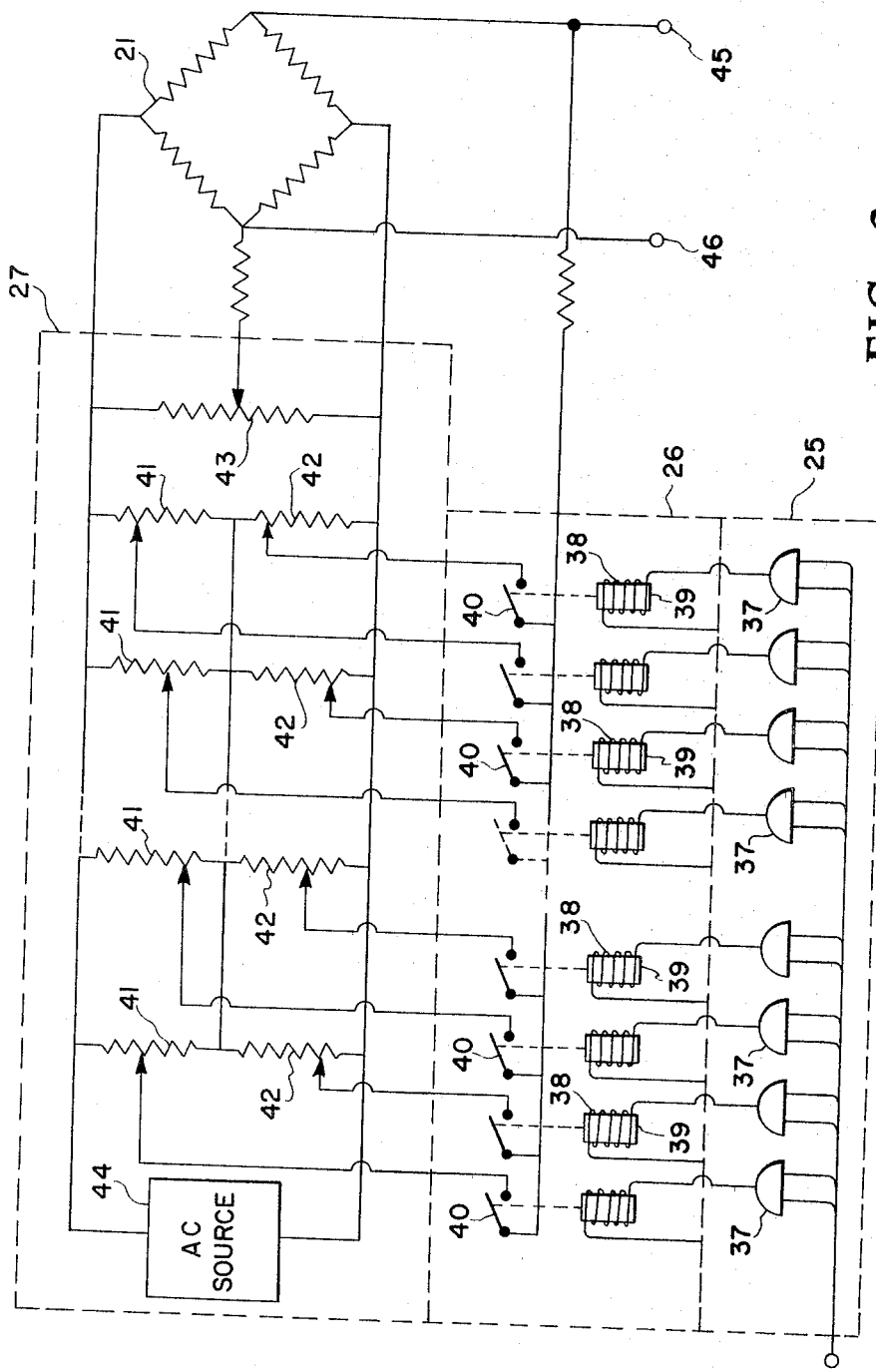
FIG. 3 is a schematic diagram of many of the electrical components shown in the block diagram in FIG. 1.

Referring now to FIG. 3 there is shown a schematic diagram of the electrical circuitry found in blocks 21, 22, 25, 26, and 27 in FIG. 1. The switching logic in block 25 consists of several "and" gates 37. In the preferred embodiment fifty-five of these "and" gates 37 are used; however, any number can be used without departing from the scope of this invention. The inputs to "and" gates 37 are supplied from output register 34 which produces eleven parallel binary bits of information. These eleven binary bits of information are applied to "and" gates 37 in combinations of two which will cause a signal to be produced at the output of one and only one of the "and" gates 37. The output of each "and" gate 37 is applied to a different relay 26. There are also fifty-five relays 26. Each relay 26 consists of a coil 38, a moving element 39 and a set of contacts 40.

The load adjusting potentiometers 27 consists of twenty-seven potentiometers 41, twenty-seven potentiometers 42, one potentiometer 43 and an A.C. voltage source 44. Pairs of potentimeters 41 and 42 are connected in series across A.C. source 44 and potentiometer 43 is connected directly across A.C. source 44. A five-volt three kc. source has been used with success as A.C. source 44. The sliders of potentiometers 41 and 42 are each connected through a separate set of contacts 40 to a terminal 45 which is connected to one side of bridge 21. The voltages at the sliders of potentiometers 42 are negative with respect to the voltages at the sliders of potentiometers 41. Consequently, either positive or negative voltages can be applied to terminal 45. The junction of potentiometers 41 and 42 is connected through a separate set of contacts 40 (not shown) to terminal 45. The slider of potentiometer 43 is connected to a terminal 46 which is connected to another slide of bridge 21. When one set of the contacts 40 closes, the voltage at the slider of one of the potentiometers 41 or 42 is applied to terminal 45. This creates a voltage across terminals 45 and 46 proportional to the load to be applied to specimen 10. When a load is applied to specimen 10, a voltage is generated across bridge 21 (terminals 45 and 46) that is proportional to the load on specimen 10. The voltage selected from the potentiometers and the voltage generated by the load on specimen 10 are summed and appear across terminals 45 and 46. This summed voltage is applied to A.C. amplifier 28.

The operation of this invention will now be described while referring to FIGS. 1-3. Punched card reader 23 reads a card and supplies eleven binary bits of information through registers 31 and 34 to switching logic 25. As a result, a voltage will be produced at the output of one of the "and" gates 37 that will activate its corresponding relay 26. The contacts 40 of this activated relay 26 will close connecting the slider of one of the potentiometers 41 or 42 to terminal 45. The voltage across terminals 45 and 46 is amplified by A.C. amplifier 28 and then changed to a D.C. voltage by demodulator 29. The resulting D.C. voltage is amplified by D.C. amplifier 17 and then applied to servo valve 16. The amount of fluid pumped through servo valve 16 by pump 15 is proportional to the output of amplifier 17. The fluid pumped through servo valve 16 will flow through either pipe 18 or pipe 19 into ram 14. If the polarity of the output of amplifier 17 is negative, the fluid will flow through pipe 18, but if the polarity is positive, the fluid flow will be through pipe 19. Fluid flow through pipe 18 into ram 14 causes a tension load to be applied to specimen 10 and fluid flow through pipe 19 causes a compression load to be applied to specimen 10. When specimen 10 is either tension loaded or compression loaded, strain gate bridge 21 becomes unbalanced. This unbalance of bridge 21 causes a voltage to appear across terminals 45 and 46 which adds to the voltage applied to terminals 45 and 46 from the slider of the selected potentiometer. The voltage caused by the unbalance of bridge 21 is negative with respect to the voltage at the slider of the potentiometer applied to terminal 45. Consequently, the voltage across terminals 45 and 46 will approach zero. When the voltage across terminals 45 and 46 reaches zero, null detector 30 produces a signal which is applied through "and" gate 36 to punched card reader 23 causing it to read another card entry. Obviously, an operator could be substituted for punched card reader 23, program control unit 24 and switching logic 25. If null detector 30 is made to visually indicate a null the contacts 40 could be manually operated by an operator in accordance with a load program.

It is to be understood that the form of the invention herewith shown and described is to be taken as a preferred embodiment. Various changes may be made in the shape, size, and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims. Testing machines constructed in accordance with this invention may operate with magnetic tape instead of punched cards and voltage level producing devices other than potentiometers could be used. Also this testing machine could be made to operate with strain gage bridge 21 producing outputs proportional to the strain on specimen 10 instead of producing outputs proportional to the load applied to specimen 10.

What is claimed is:

1. A fatigue testing machine for applying a predetermined load program consisting of a series of discrete load levels, to a test specimen comprising: means including a strain gage for producing a discrete electrical signal proportional to one of said discrete load levels; means for applying a load to said test specimen in accordance with an error electrical signal; means for producing a nondiscrete electrical signal proportional to the load on said test specimen and negative with respect to said discrete electrical signal; means for summing said discrete electrical signal and said nondiscrete electrical signal to form said error signal; and means to cause said means for producing a discrete electrical signal to produce another discrete electrical signal proportional to the next load level in said predetermined load program when said error signal reaches a predetermined level whereby the load levels in said predetermined load program are successively applied to said test specimen.

2. A fatigue testing machine in accordance with claim 1 wherein said means for applying a load to said test specimen in accordance with said error electrical signal comprises: a hydraulic ram for applying a load to said specimen; a pump for supplying a fluid to said ram; and a servo valve connected between said pump and said ram and controlled by said error signal whereby the load applied to said specimen is related to said error signal.

3. A fatigue testing machine for applying a predetermined load program, that is programmed on a set of punched cards, to a test specimen comprising: a group of potentiometers whose sliders are adjusted so that each potentiometer produces a discrete electrical signal; a punched card reader for reading one of said punched cards; means responsive to the output of said punched card reader for selecting the output of one of said group of potentiometers; means for applying a load to said test specimen in accordance with an error electrical signal; means for producing an electrical signal proportional to the load on said test specimen; means for summing said selected output of one of said group of potentiometers and said electrical signal proportional to the load on said test specimen to form said error signal; and means responsive to said error signal for signalling said punched card reader to read the next card when said error signal reaches a predetermined level whereby the load levels in said predetermined load program are successively applied to said test specimen.

4. A fatigue testing machine in accordance with claim 3 wherein said means for selecting the output of one of said group of potentiometers includes switching logic and a group of relays.

5. A fatigue testing machine in accordance with claim 3 wherein said means for applying a load to said test specimen in accordance with said error electrical signal comprises: a hydraulic ram for applying a load to said specimen; a pump for supplying a liquid to said ram; and a servo valve connected between said pump and said ram and controlled by said error signal whereby the load applied to said specimen is related to said error signal.

6. A fatigue testing machine in accordance with claim 3 wherein said means for signalling said punched card reader is a null detector.

7. A fatigue testing machine in accordance with claim 3 including means responsive to the output of said punched card reader for performing external functions.

8. A fatigue testing machine for applying a predetermined load program consisting of a series of discrete load levels, to a test specimen comprising: means including a group of potentiometers whose sliders are adjustable so that each potentiometer can produce an output different from all other potentiometers, for producing a discrete electrical signal proportional to one of said discrete load levels; means for applying a load to said test specimen in accordance with an error electrical signal; means for producing a nondiscrete electrical signal proportional to the load on said test specimen and negative with respect to said discrete electrical signal; means for summing said discrete electrical signal and said nondiscrete electrical signal to form said error signal; and means to cause said means for producing a discrete electrical signal to produce another discrete electrical signal proportional to the next load level in said predetermined load program when said error signal reaches a predetermined level whereby the load levels in said predetermined load program are successively applied to said specimen.

References Cited by the Examiner
UNITED STATES PATENTS

| 3,009,354 | 11/1961 | Schwaninger | 73—90 |
| 3,022,662 | 2/1962 | Hebeler | 73—90 X |
| 3,095,733 | 7/1963 | Sjostrom | 73—91 |

RICHARD C. QUEISSER, *Primary Examiner.*

J. W. MYRACLE, *Assistant Examiner.*